United States Patent
Rosner et al.

(10) Patent No.: US 6,718,356 B1
(45) Date of Patent: Apr. 6, 2004

(54) IN-PLACE OPERATION METHOD AND APPARATUS FOR MINIMIZING THE MEMORY OF RADIX-R FFTS USING MAXIMUM THROUGHPUT BUTTERFLIES

(75) Inventors: Stephan Rosner, Dresden (DE); Frank Barth, Radebeul (DE)

(73) Assignee: Advanced Micro Devices, Inc., Austin, TX (US)

( * ) Notice: Subject to any disclaimer, the term of this patent is extended or adjusted under 35 U.S.C. 154(b) by 616 days.

(21) Appl. No.: 09/595,409

(22) Filed: Jun. 16, 2000

(51) Int. Cl.$^7$ .............................................. G06F 15/00
(52) U.S. Cl. ...................................................... 708/404
(58) Field of Search ................................ 708/400, 401, 708/402, 403, 404, 405, 406, 408, 409

(56) References Cited

U.S. PATENT DOCUMENTS 6,122,703 A    9/2000   Nasserbakht

FOREIGN PATENT DOCUMENTS

EP            0805401 A1    11/1997

OTHER PUBLICATIONS

Bailey D.H.: "A High–Performance Fast Fourier Transform Algorithm for the Cray–2," *Journal of Supercomputing*, vol. 1, No. 1, pp. 43–60, Netherlands 1987.

Johnson L.G.: "Conflict Free Memory Addressing for Dedicated FFT Hardware," *IEEE, Inc. Transactions on Circuits and Systems II: Analog and Digital Signal Processing*, IEEE Inc. New York, US., vol. 39, No. 5, New York, USA 1992.

International Search Report dated Sep. 17, 2001.

*Primary Examiner*—Chuong Dinh Ngo
(74) *Attorney, Agent, or Firm*—Williams, Morgan & Amerson

(57) ABSTRACT

The invention relates generally to radix-r FFTs (Fast Fourier Transforms), and more particularly to a method and an apparatus for assigning data samples to memory when computing a radix-r FFT. In one embodiment, the apparatus comprises a plurality of memory banks for storing the data samples, a memory bank counter indicating the memory banks, a data sample counter for counting an increment of the data samples, a region difference counter for counting a region difference change of a butterfly stage, a computer program having the current values of the data sample counter and the region difference counter as input values for determining whether the fractional part of the current data sample value divided by the current region difference value equals zero, and a multiplexer for multiplexing the current data sample to an assigned memory bank if the fractional part is not equal zero.

12 Claims, 3 Drawing Sheets

IN-PLACE OPERATION METHOD AND APPARATUS FOR MINIMIZING THE MEMORY OF RADIX-R FFTS USING MAXIMUM THROUGHPUT BUTTERFLIES

BACKGROUND OF THE INVENTION

1. Field of the Invention

The present invention relates to radix-r FFTs (Fast Fourier Transforms), and more particularly to a method and an apparatus for assigning data. samples to memory when computing a radix-r FFT.

2. Background of the Invention

Generally, the performance of computer systems is strongly related to memory access speeds. In particular, the present calculation of FFT algorithms requires, intensive memory access and storage operations.

The FFT is a class of algorithms widely used in the field of digital signal processing that break down complex signals into elementary components. The FFT is a discrete fourier transform (DFT) algorithm, which reduces the number of computations needed for N points from $2N^2$ to $2N\lg N$, where lg is the base-2.

Radix-r, N-point FFTs can be described by SDF (synchronous data flow) graphs consisting of vertices performing butterfly operations and arcs denoting data transfers between them. A butterfly operation is the smallest constituent part of a FFT and represents a cross multiplication incorporating multiplication, sum and difference operations. The name is derived from the shape of the signal flow diagram. For a radix-2 FFT, the smallest transform or butterfly operation (basic computational unit) used is the 2-point DFT. Each FFT vertex consumes a different set of data and thus, in data processing applications in a computer, accesses a different set of memory locations.

In state of the art FFT computation systems, successive memory accesses to the same memory bank may occur, which will impose the execution of wait states as part of the butterfly operations. An alternative for avoiding such successive accesses is to provide additional memory for temporary storage. This leads to higher costs or the performance of such systems decreases.

It is therefore desirable to minimize or eliminate wait states and to minimize the total memory required when computing a radix-r FFT.

SUMMARY OF THE INVENTION

The present invention provides a method and apparatus for assigning data samples to memory when computing a radix-r FFT. This method includes the steps of incrementing a memory bank counter if the fractional part of a data sample divided by a region difference of a butterfly stage equals zero, assigning the data sample to a memory bank indicated by the memory bank counter, executing the first step if the total number of data samples is not reached by a region difference counter counting a region difference change of a butterfly stage, and executing the last step until the total number of data samples is reached by a data sample counter.

The present invention also provides an apparatus for assigning data samples to memory when computing a radix-r FFT, comprising a plurality of memory banks for storing the data samples, a memory bank counter indicating the memory banks, a data sample counter for counting an increment of the data samples, a region difference counter for counting a region difference change of a butterfly stage, a computer program having the current values of the data sample counter and the region difference counter as input values for determining whether the fractional part of the current data sample index divided by the current region difference value equals zero, and a multiplexer for multiplexing the current data sample to an assigned memory bank if the fractional part is not equal zero.

Generally, the present invention minimizes memory and wait states required to implement a FFT in a computer system, while still allowing maximum throughput (single cycle) through the vertices or a butterfly operation. Moreover, the present invention optimizes the trade-off of memory size versus FFT performance.

BRIEF DESCRIPTION OF THE PREFERRED EMBODIMENT

The above and other objects, features and advantages of the present invention will become more readily apparent from the following description, reference being made to the accompanying drawings in which.

DETAILED DESCRIPTION OF THE DRAWINGS

Figure 1:
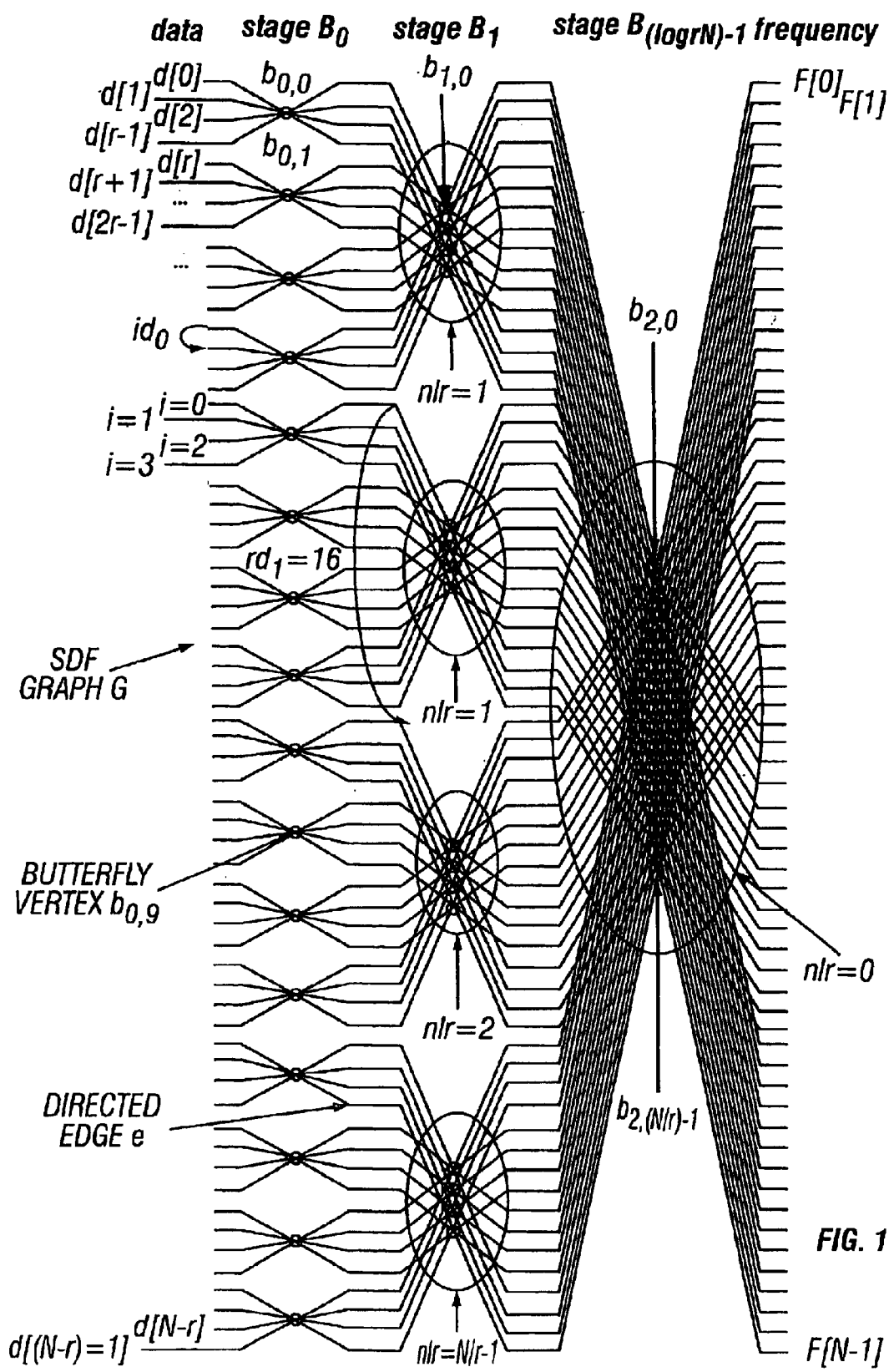
FIG. 1 depicts a graph of a radix-4, 64 point FFT.

Referring now to FIG. 1, a radix-4, 64-point FFT is depicted. It should be noted that the arrow heads on the arcs pointing from stages with smaller to higher index are not shown. The FFT is described by a SDF graph G=(B, E), where B=(b) denotes the vertex set of butterfly operations and E=(e) denotes the set of directed edges connecting them. Radix-4 means that each butterfly vertex of butterfly stage $B_0$ receives 4 input data samples. Therefore, a radix-4, 64-point FFT has 4×16=64 input data samples. The data samples are designated by d and the inputs and outputs of a butterfly vertex are indexed by i. For each stage, the butterfly vertices are shown.

A butterfly vertex is executed in one cycle if maximum throughput is assumed. FFT hardware costs can be reduced by minimizing the memory for storing the data to be fed in the FFT hardware executing the butterfly vertices. Since a butterfly vertex of a radix-r FFT consumes and generates r data samples at once when it is executed, the minimum memory requirements are r independently accessible memory banks and a total memory volume of N data samples, if in-place operation is assumed. In-place operation in this context means that the results of each butterfly computation may be stored back in memory in the same locations from which the inputs to the butterfly were obtained. Each butterfly vertex consumes a different set of data and therefore, accesses a different set of memory locations. Thus, in one embodiment of the present invention, the data is arranged in such a way that the input data for all butterfly vertices reside on different memory banks. If such an arrangement is not used, either performance will decrease due to successive memory accesses to the same memory bank imposing wait states on the butterfly operation, or additional memory has to be provided for temporary data storage, resulting in increased system costs.

A FFT transforms discrete time samples f[x] into discrete frequency samples F[x]. As shown in FIG. 1, in order to avoid bit-reversed F[x], f[x] has to be applied bit-reversed. Therefore, f[x] is mapped to an already bit-reversed input vector d[x] so that $f[x]_{bit-reversed}=d[x]$ is fulfilled.

The FFT described by the synchronous data flow graph in FIG. 1 is N-points radix-r, whereby the requirement frac(N/r)=0 is met. The function frac determines the fractional part of a number. For example, frac(x) returns the value (x−floor(x)). The function floor returns the largest integer value that is smaller than or equal to the one given by x. For complex numbers, the functions frac and floor are applied separately to the real and imaginary part.

For the description of all simultaneously accessible memory address locations and detailed explanation of the present invention, the definitions stage, index difference, local region and region difference will be introduced. These definitions are explained in the following:

Stage ($B_{sn}$): As shown in FIG. 1, a stage $B_{sn} \subseteq B$ is a subset of vertices of the synchronous data flow graph, where each $b \in B_{sn}$ has the same static level. For a N-point radix-r FFT, the number of stages equals $\log_r N$. As shown for three stages in FIG. 1, the stages are indexed by sn $\in [0, (\log_r N)-1]$. Each stage $B_{sn}$ contains N/r vertices that are indexed by ss $\in [0, (N/r)-1]$. Hence, each vertex $b \in B$ may be identified by sn and ss and therefore, is uniquely defined by $b_{sn,ss}$. For example, the first vertex of stage $B_0$ is identified by $b_{0,0}$ and the second vertex of the same stage by $b_{0,1}$. For a radix-r FFT, the vertices have r inputs and r outputs. The inputs and outputs are indexed by the variable i $\in [0, r-1]$. As illustrated in FIG. 1, the FFT input vector d[x] with x $\in [0, N-1]$ is applied to $B_0$ so that d[x] is assigned to $b_{0,i+r\cdot\lfloor x/r \rfloor}$.

Index difference ($id_{sn}$): When ordering the indexes of the input data for each butterfly, it should be noted that the index difference $id_{sn}$ between two subsequent data indexes is constant for a butterfly. The index difference may be determined by the following equation:

$$id_{sn} = r^{sn} \quad (1)$$

Therefore, the index difference is also constant for the complete stage $B_{sn}$. For example, an arrow indicating $id_0$ is depicted in butterfly vertex $b_{0,3}$ of FIG. 1.

Local region (lr): A local region is a minimal set of vertices in a stage, which accesses a contiguous set of data samples d[x]. Data samples are contiguous if their indexes are contiguous. In stage $B_0$, each butterfly represents a local region. The members of a local region are indexed by mlr $\in [0, r^{sn}-1]$. As shown in FIG. 1, index nlr numbers all local regions in stage sn.

Region difference ($rd_{sn}$): Two local regions in stage sn, which cover together again a contiguous set of data, are subsequent to each other. The region difference $rd_{sn}$ denotes the difference between the smallest data index of such two regions It may be described by the following equation:

$$rd_{sn} = r^{(sn+1)} \quad (2)$$

The region difference is constant for all subsequent regions in $B_{sn}$. Hence the total number of regions in a stage equals $N/rd_{sn}$, which bounds the numbers of local regions nlr to the interval $[1, N/rd_{sn}]$ and the index for the local regions to $[0, N/rd_{sn}-1]$. For example, an arrow indicating a region difference in stage 1 $rd_1=16$ is depicted in FIG. 1.

Based on these definitions, a memory access scheme according to the present invention for application in a computer system is derived and described in the following. By this memory access scheme, the set of simultaneously accessible data and thus, the set of simultaneously accessible addresses $A_{simult}$ can be determined.

In a computer memory, each data sample d[x] resides at an address $a_x \in A$, where A denotes the address space. In-place execution is assumed, i.e. input i of a given butterfly reads its data from $a_x$, and its output i overwrites $a_x$ after execution of this butterfly. By use of equations (1) and (2), $A_{simult} \subseteq A$ can be described as:

$$A_{simult}(mlr, nlr, sn) = (a_y | y = i \cdot id_{sn} + mlr + nlr \cdot rd_{sn}) \quad (3)$$

In equation (3), it is stage index sn $\in [0, (\log_r N)-1]$, butterfly input index i $\in [0, r-1]$, index member of local region mlr $\in [0, r^{sn}-1]$ and index number of local region nlr $\in [0, (N/rd_{sn})-1]$.

Each address from address space A of the computer memory is assigned to a memory m $\in$ M, card(M)=r. For achieving the desired minimum memory requirements when computing a radix-r, N-point FFT, a data distribution has to be found that guarantees:

for all $a_v, a_w \in A_{simult}(mlr, nlr, sn)$:

$$m(a_v) \neq m(a_w) \quad (4)$$

This in equation (4) means that any pair of simultaneously accessible addresses has to reside on different memory banks of the computer memory.

By means of executing the following memory access scheme on a computer system when computing a radix-r, N-point FFT, the data samples are assigned to determined memory banks, whereby the access condition (4) is always fulfilled. Therefore, successive memory accesses to the same memory bank, which would lead to execution delay, are avoided.

```
1. mem_sel = 0;
2. for (x=0, x≦N-1 x++) {
3.     for(rd_sn=r, rd_sn<N, rd_sn=rd_sn·r){
4.         if (frac(x/rd_sn) = 0) INC_modulo-r mem_sel
5.         else
       } // for rd_sn
6.     mem_mem_sel[x] = d[x]
7.     INC_modulo-r mem_sel
   } // for x
```

Figure 3:
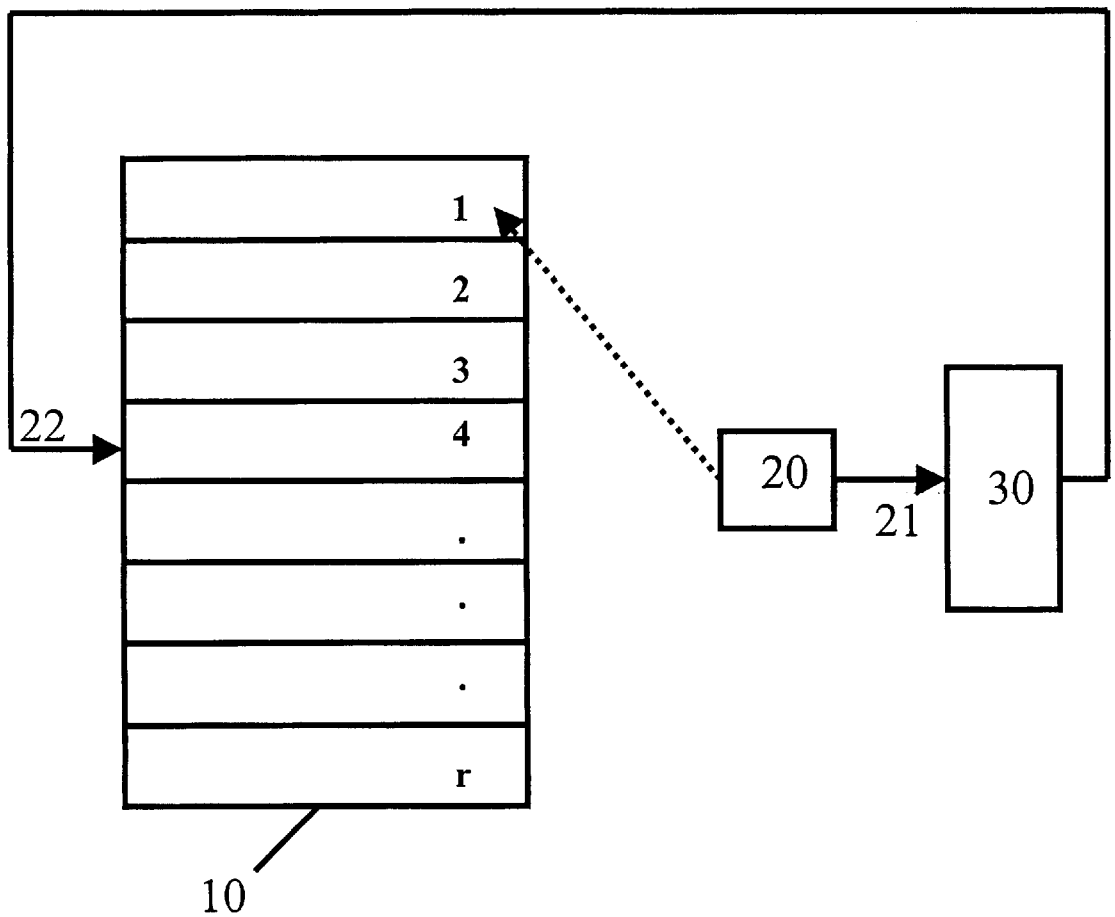
FIG. 3 depicts a block diagram of a data processing system implementing the present invention.

In the following, this memory access scheme will be explained in detail. Reference is also made to FIG. 3, in which a data processing system for executing the inventive memory access scheme is depicted. In FIG. 3, the data processing system comprises a storage memory 10 having memory banks 1 to r, a memory pointer 20 and a processing element 30. All memory banks 1 to r are independently accessible. Data, which is stored in a memory bank, is transferred via memory pointer 20 and data line 21 from the storage memory 10 to the processing element 30. After processing of the data by the processing element 30, the processed data is transferred back (22) to respective memory banks of the storage memory 10. The memory banks are assigned according to the above indicated memory access scheme.

In step 1 of the memory access scheme, an initial memory bank is selected by a memory pointer 20. Step 2 enumerates the data samples. For each enumeration step, memory pointer 20, which is a ring pointer, selecting one of the r memory banks is rotated (cf. step 7, where the next memory bank is selected), and the enumerated data item is assigned to the memory selected by the pointer 20 (cf. step 6). The memory pointer 20 is also rotated (without assigning data), when all data for one butterfly, all data for a local region or all data for a stage have been assigned (steps 3–5). Since a butterfly vertex and a stage represent special cases of local regions, a single test for fulfillment of the condition frac(x/

$rd_{s,n})=0$ is sufficient for all three cases. This test, whether a local region is complete, is executed in step 4. As illustrated in FIG. 3, the memory pointer 20 is controlled by a processing element 30.

Figure 2:
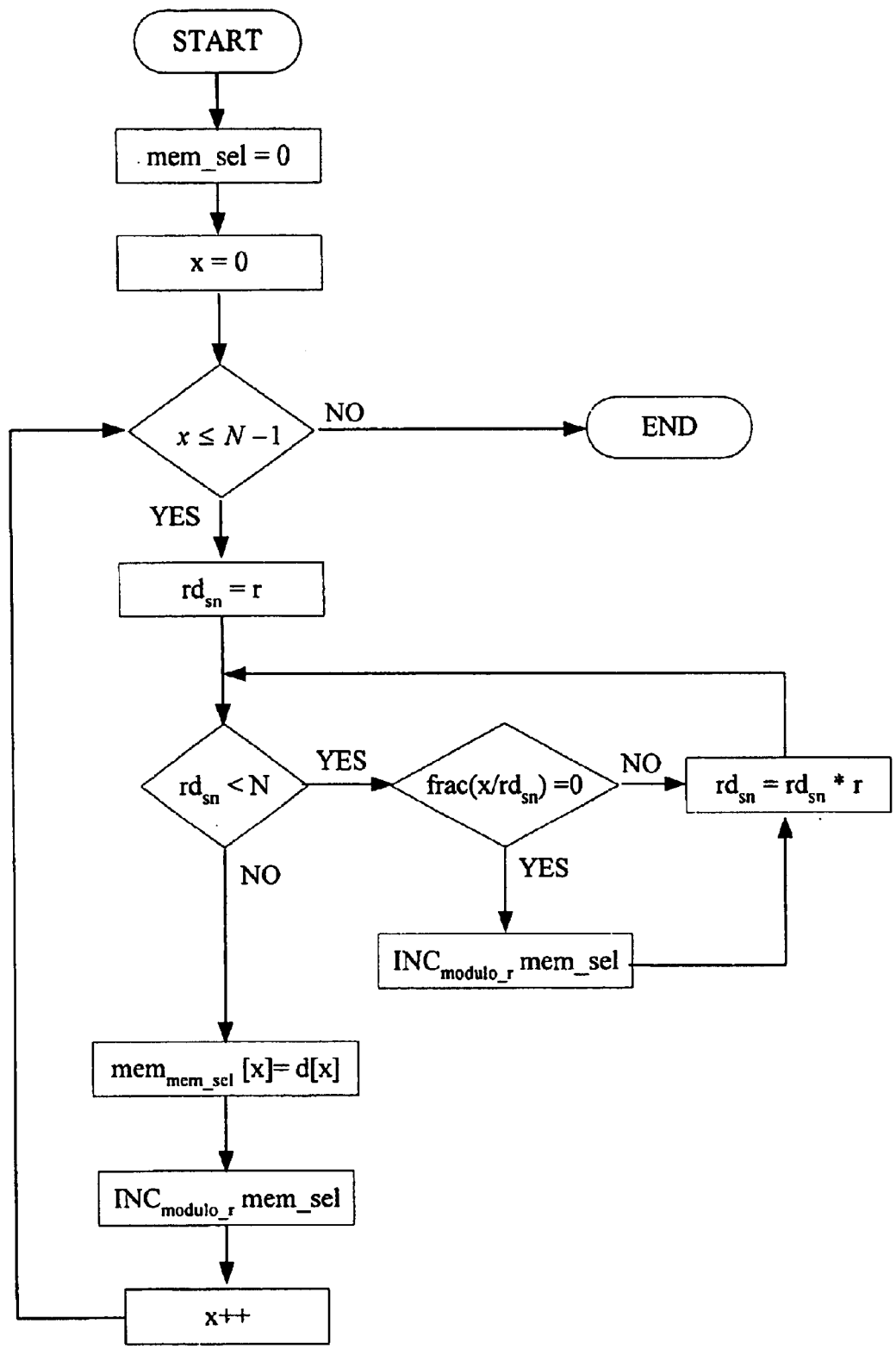
FIG. 2 depicts a flowchart of a memory assignment scheme according to the present invention.

Referring now to FIG. 2, a flowchart of the above described memory access scheme is depicted. It should be noted that the terms indicated in the process and decision blocks have the same meaning as explained above. By execution of this procedure, each data sample is assigned to a different memory bank.

The present invention provides minimum memory requirements without deteriorating the performance of the FFT butterflies. Additionally, a conflict free memory access scheme for in-place FFT working with the minimum amount of both total memory and memory ports while guaranteeing avoidance of starvation for single cycle throughput butterflies is provided. This leads to area savings in silicon implementations of FFTs and an easy to implement decoder design. Therefore, the present invention improves density, increases operation speed, improves efficiency, and reduces the manufacturing costs.

Although preferred embodiments have been described in detail herein, it will be apparent to the expert in the relevant art that various modifications and substitutions and the like can be made within the spirit of the invention and these modifications and substitutions can be considered to be within the scope of the invention in accordance with the following claims.

What is claimed is:

1. Apparatus for assigning a plurality of data samples to memory when computing a radix-r Fast Fourier Transform, comprising:
   a plurality of memory banks for storing data samples;
   a memory bank pointer for indicating said memory banks;
   a processing element adapted to:
   determine a portion of the plurality of the data samples corresponding to each of a plurality of butterfly vertices having a plurality of successive stages;
   increment the memory bank pointer if a fractional part of a data sample index divided by a region difference of each stage equals zero;
   associate each data sample in the determined portion of the plurality of data samples with one of the plurality of memory banks using the memory bank pointer, such that each data sample in the determined portion of the plurality of data samples is associated with a different memory bank; and
   increment the memory bank pointer in response to associating each data sample with one of the plurality of memory banks.

2. The apparatus of claim 1, wherein all memory banks are independently accessible.

3. The apparatus of claim 1, wherein said memory bank pointer is initialized in the beginning.

4. The apparatus of claim 1, wherein said region difference changes by multiplication by r in successive stages.

5. The apparatus of claim 1, wherein each of said butterfly vertices is executed in one cycle.

6. The apparatus of claim 1, wherein said data samples are bit-reversed.

7. A method for assigning a plurality of data samples to memory when computing a radix-r Fast Fourier Transform using a plurality of butterfly vertices in a plurality of successive stages, comprising:
   determining a portion of the plurality of data samples corresponding to each of the butterfly vertices;
   selecting a data sample index corresponding to the data sample in the determined portion of the plurality of data samples;
   determining whether the data sample index is equal to an integer multiple of a region difference of each of the plurality of successive stages;
   incrementing a memory bank index in response to each determination that the data sample index is equal to the integer multiple of the region difference of each of the plurality of successive stages;
   associating each data sample in the determined portion of the plurality of data samples with one of a plurality of memory banks using the memory bank index and the data sample index, such that each data sample in the determined portions of the plurality of data samples is associated with a different memory bank; and
   incrementing the memory bank index in response to associating each data sample in the determined portion of the plurality of data samples with one of the plurality of memory banks.

8. The method of claim 7, wherein incrementing the memory bank index comprises selecting an initial memory bank index.

9. The method of claim 7, further comprising storing the plurality of data samples in the associated memory banks.

10. The method of claim 9, wherein storing the plurality of data samples comprises storing the plurality of data samples using a ring pointer to indicate the associated memory bank.

11. The method of claim 7, wherein determining the portion of the plurality of the data samples corresponding to each of the butterfly vertices comprises determining a portion of a plurality of bit-reversed data samples corresponding to each of the butterfly vertices.

12. The method of claim 7, wherein determining the portion of the plurality of the data samples corresponding to each of the butterfly vertices comprises determining r data samples corresponding to each of the butterfly vertices.

* * * * *